(12) United States Patent
Delaye

(10) Patent No.: US 6,431,005 B1
(45) Date of Patent: Aug. 13, 2002

(54) MICROSYSTEM WITH A FLEXIBLE MEMBRANE PRESSURE SENSOR

(75) Inventor: Marie-Thérèse Delaye, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/060,607

(22) Filed: Apr. 15, 1998

(30) Foreign Application Priority Data

Apr. 17, 1997 (FR) .............................. 97 04767

(51) Int. Cl.[7] ................................................. G01L 9/12
(52) U.S. Cl. ........................................................ 73/724
(58) Field of Search .................... 73/718, 724, 715, 73/716; 361/283.3, 283.4

(56) References Cited

U.S. PATENT DOCUMENTS

| | | | |
|---|---|---|---|
| 4,577,345 A | * | 3/1986 | Abramov ........................ 382/4 |
| 5,241,864 A | * | 9/1993 | Addie et al. .................... 73/718 |
| 5,291,534 A | * | 3/1994 | Sakurai et al. ................. 73/724 |
| 5,349,492 A | * | 9/1994 | Kimura et al. ............. 361/283.4 |
| 5,417,111 A | | 5/1995 | Sherman et al. |
| 5,453,628 A | | 9/1995 | Hartsell et al. |
| 5,471,723 A | | 12/1995 | Lüder et al. |
| 5,510,276 A | | 4/1996 | Diem et al. |
| 5,573,679 A | | 11/1996 | Mitchell et al. |
| 5,646,346 A | * | 7/1997 | Okada ..................... 361/283.3 |

FOREIGN PATENT DOCUMENTS

| | | |
|---|---|---|
| CA | 2130505 | 2/1995 |
| FR | 2700003 | 7/1994 |

OTHER PUBLICATIONS

Transducers '95—Eurosensor IX, 384–387 (1995) "A Surface Micromachined . . . " Yao, J. J., et al, (no month).

* cited by examiner

Primary Examiner—William Oen
(74) Attorney, Agent, or Firm—Eugene Lieberstein; Michael N. Miller; Anderson Kill & Olick

(57) ABSTRACT

A pressure sensor cell has a substrate including at least a first electrode and a deformable membrane. The membrane is fixed by its peripheral edge to the substrate and is spaced from the substrate to define a closed chamber around at least a part of the first electrode. A second electrode is provided formed on a wall of the membrane. The second electrode faces the first electrode and is kept separate from the first electrode if no pressure is exerted on the membrane. Finally, an electronic circuit is placed in the substrate under the first electrode.

7 Claims, 4 Drawing Sheets

MICROSYSTEM WITH A FLEXIBLE MEMBRANE PRESSURE SENSOR

TECHNICAL DOMAIN

This invention relates to a microsystem with a flexible membrane for a pressure sensor and its manufacturing process.

A microsystem with a flexible membrane refers to a pressure sensor cell, for example of a capacitive measurement type, or a switch cell triggered by pressure.

The invention has applications in the manufacture of microsensors, microswitches, variable microcapacitors, and more generally micro-components that can be integrated with an associated electronic circuit. One particular application of the invention is the manufacture of a fingerprints sensor.

STATE OF PRIOR ART

Document (1), the reference of which is given at the end of this description, describes the manufacture of pressure micro-sensors with a deformable silicon membrane.

Due to their manufacturing process, compatibility difficulties occur when making this type of microsensor jointly with CMOS type integrated circuits. Furthermore, these sensors include a generally conducting membrane, which may cause electrical insulation problems when components are miniaturized.

Insulating membrane sensors made on glass substrates are also known. For example, this type of sensor is described in document (2), the reference of which is given at the end of this description.

Document (3), the reference of which is also given at the end of this description, describes the manufacture of sensors associated with electronic circuits and adjacent to each other on the same substrate. This type of design is particularly attractive for production manufacturing.

However, it has a number of limitations concerning interconnection problems between sensors and the corresponding electronic circuits. The electrical connections between the sensors and integrated circuits placed on the same substrate generate harmful parasite capacitance effects. Furthermore, the electrical connections are cumbersome and form an obstacle to increased miniaturization of the devices.

Finally, separate manufacturing of sensors and associated electronic circuits result in high manufacturing costs.

DESCRIPTION OF THE INVENTION

The purpose of this invention is to propose a process for manufacturing Microsystems with a flexible membrane that do not have the limitations mentioned above. In particular, one purpose is to propose Microsystems with a flexible membrane made integrally on a substrate according to a process compatible with the manufacture of MOS integrated circuits in the same substrate.

Another purpose is to significantly reduce the size of the microsystems and the associated electronic circuits.

Another purpose is to propose pressure sensors or integrated microswitches that can be laid out in the form of a large number of adjacent cells, for example in the form of a matrix.

Another purpose is to propose a fingerprints detector using this type of sensor.

Finally, another purpose is to reduce the manufacturing cost of Microsystems with flexible membranes.

In order to achieve these objectives, the purpose of the invention is more precisely a process for manufacturing a microsystem for a pressure sensor comprising the following steps:

a) deposit and forming of at least a first conducting layer on a support, the conducting layer forming at least a first electrode, b) deposit and forming of at least one layer of sacrificial material covering the first conducting layer, c) deposit and forming of a second conducting layer on the layer of sacrificial material in a region located above the first conducting layer, the second conducting layer forming a second electrode, d) formation of a first membrane layer covering and surrounding the layer of sacrificial material and the second conducting layer, e) elimination of the layer of sacrificial material, f) forming the first membrane layer.

The steps in the process are preferably carried out in the order mentioned above. However the order of steps e) and f) can be reversed. Furthermore, in one special embodiment, the layers mentioned in steps b) and c) may be formed at the same time.

In particular, when major cutting or thinning operations are necessary on the first membrane layer, it is useful to not release it by eliminating the sacrificial layer, until it has been completely formed.

The layer of sacrificial material is formed so as to define the shape and size of a closed chamber, in which one wall is formed by the first membrane layer.

The process according to the invention can be used to make simple and inexpensive Microsystems, and particularly cells for pressure sensors suitable for common integration with CMOS or BICMOS type circuits on the same substrate. This aspect will be described in more detail in the rest of the description.

Beneficially, with the process according to the invention, the first and second conducting layers forming the electrodes are not separated by any material layer. After the layer of sacrificial material has been eliminated, the second conducting layer is kept separated from the first conducting layer by means of the flexible membrane layer, when there is no pressure exerted on this membrane layer.

A particularly sensitive sensor cell can be made by adjusting the thickness of the layer of sacrificial material.

Furthermore, the first and second layers of conducting material may be separated by a very small distance only, for example of the order of about 0.1 $\mu$m to 5 $\mu$m. This characteristic is also useful for making sensitive sensors. For example, the first and second layers could form the armatures of a capacitor in which the capacitance varies as a function of a deformation of the membrane layer.

In other applications, the microsystem obtained by the process according to the invention could also form a microswtich. The first and second conducting layers may in this case form the terminals of the switch. For example, this type of switch is open when the deformation of the membrane layer is insufficient for the first and second conducting layers to come into contact with each other, and is closed when the conducting layers are pressed in contact with each other.

According to one alternative embodiment of the microsystem for use as a switch, a groove is formed in the first layer of conducting material to separate and delimit two electrodes, and the second conducting layer is then formed on the layer of sacrificial material in a region above at least one portion of the groove.

In a microsystem made according to this alternative, when the membrane layer is deformed, the second conducting layer electrically connects the two electrodes in the first conducting layer which thus form the terminals of the switch.

According to one specific embodiment of the process according to the invention, elimination of the layer of sacrificial material may include opening of at least one etching channel through the first membrane layer, etching of the layer of sacrificial material and the formation of a second membrane layer covering the first membrane layer and closing the etching channel, the second membrane layer also being formed during step f) in the process.

For example, step f) may include partial elimination of the second membrane layer and thinning of the first membrane layer in a region surrounding the second electrode.

Thinning of the first membrane can precisely adjust its suppleness or flexibility and therefore the sensitivity of the microsystem.

Preferably, thinning takes place in a region surrounding the electrode formed in the second conducting layer but not above this electrode. This characteristic increases the stiffness of the membrane in the region of the second electrode and thus prevents excessive deformation of this electrode when pressure is applied to the membrane.

Preferably, formation of the first membrane layer may include the successive deposit of three sublayers of material, in which at least one sublayer forms an etching stop sublayer. The first membrane layer is then thinned by etching, stopping the etching on the etching stop sublayer.

Thus the final thickness of the membrane layer may be very small without risking penetration during etching. Furthermore, the thickness may be determined very accurately.

According to another advantageous aspect, the channel for eliminating the layer of sacrificial material can be formed in a region in the first membrane layer located above a peripheral part of the layer of sacrificial material.

This arrangement avoids the need to increase the stiffness of the membrane if the material in the second membrane layer enters the channel and forms a plug supported on the support of the first conducting layer. Formation of a plug in a peripheral region of the membrane only very slightly affects the flexibility of the membrane.

According to one particular embodiment of the process according to the invention, forming of the first membrane layer may also take place before the layer of sacrificial material is eliminated. In this case, forming of the membrane layer may include etching of one or several channels in the form of through trenches reaching the layer of sacrificial material.

These trenches are used to eliminate the layer of sacrificial material.

They can also be used to partly release part of the membrane layer, when the sacrificial material has been eliminated. The trenches may be laid out to define part of the perimeter of a portion of the membrane layer. The trenches are then preferably above a peripheral part of the layer of sacrificial material.

The first conducting layer may be made flush with the support surface. In this case, in step a) the first conducting layer is formed in a recess formed in the support such that the first conducting layer and the support have flush surfaces.

This type of construction may be beneficial when the microsystem is used as a sensor cell with capacitive measurement of the membrane deformation.

However, when the microsystem is used as a switch, it is preferable that at least the first or the second electrode projects above its support.

This can be done, for example by forming the second conducting layer in a recess formed in the layer of sacrificial material, in a region located above the first conducting layer.

According to one possible alternative, step b) includes the formation of a first layer of sacrificial material surrounding at least part of the first conducting layer and then a second layer of sacrificial material is formed covering the first layer of sacrificial material and the said part of the first conducting layer, and the first and second layers of sacrificial material are formed. Due to this arrangement, the second layer of sacrificial material has a recess on its free upper surface that is filled by the second conducting layer. Thus after the sacrificial material has been eliminated, the second conducting layer projects on the surface of the membrane layer facing towards the support.

The invention also relates to a pressure sensor cell comprising:
 a substrate comprising at least a first electrode,
 a deformable membrane fixed by an edge around the periphery of the substrate and defining a closed chamber around at least part of the first electrode,
 a second electrode formed on a wall of the deformable membrane facing towards the first electrode and kept separate from the first electrode in the lack of any pressure exerted on the membrane.

The pressure sensor cell may also comprise or be associated with an electronic measurement circuit integrated into the substrate and connected to the first and second electrodes.

Beneficially, the electronic circuit may be placed in the substrate under the first electrode.

A better integration of the cell and the integrated circuit may be obtained due to this characteristic.

In particular, this means that a fingerprints sensor comprising a large number of adjacent sensor cells can be made, for example in the form of a matrix. All cells and the associated electronic circuits can then be made on or in the same support.

Note that microsystems and cells according to the invention are particularly suitable for use with CMOS (Complementary Metal Oxide Semiconductor) or BiCMOS (BipolarCMOS) type integrated circuits.

Other characteristics and advantages of the invention will become clear from the following description with reference to the figures in the attached drawings. This description is given for illustration purposes only and is in no way restrictive.

DETAILED DESCRIPTION OF EMBODIMENTS OF THE INVENTION

Figure 1:
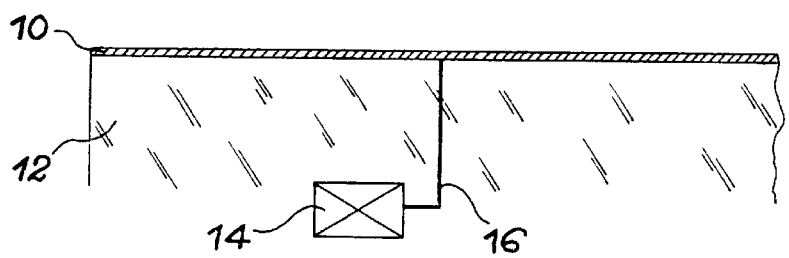
FIGS. 1 to 8 are schematic sections showing the successive steps in a process for manufacturing a microsystem according to the invention.

FIG. 1 shows a first step in a process according to the invention. A first layer 10 of a conducting material such as for example titanium, titanium nitride, chromium or any other compatible conductor, is deposited on a support 12. The layer 10 is deposited for example by cathodic spraying or by evaporation under vacuum to a thickness of the order of 100 nm to a few micrometers. The layer 10 may also be formed by any other deposition technique, for example such as electrolysis.

Support 12 may be a substrate plate, for example made of silicon or glass, and particularly an integrated circuit board. Beneficially, support 12 contains one or several electronic circuits such as measurement circuits to be used in Microsystems made according to the invention. These circuits, preferably of the CMOS or BiCMOS type are represented schematically as reference 14 in the figure. Reference 16 denotes an electrical connection between the electronic circuit 14 and the first conducting layer 10.

Figure 2:
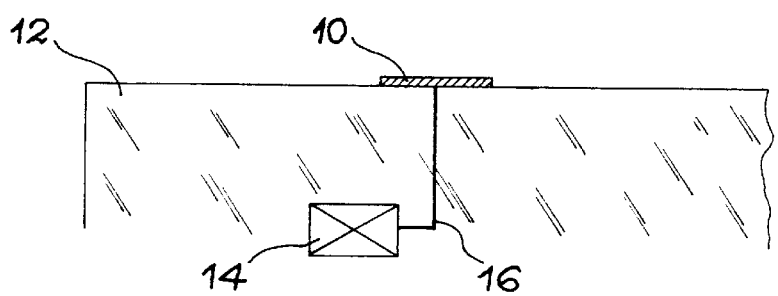

A photolithography and dry or chemical etching step forms the first layer of conducting material 10 as shown in FIG. 2. The conducting layer 10 formed makes up a first electrode in the microsystem denoted by the same reference 10 for simplification reasons.

Figure 3:
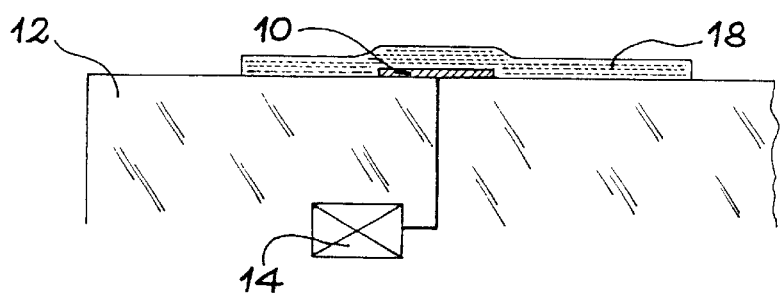

A subsequent step shown in FIG. 3 comprises the deposition and forming of a layer 18 of sacrificial material. The shape and thickness of this layer define the dimensions of a chamber in the microsystem enabling the deformation of a flexible membrane described later. The thickness of the sacrificial layer may be for example between 0.1 $\mu$m and 5 $\mu$m. The layer of sacrificial material is made from a material with a good etching selectivity compared with other materials used to make the microsystem. The material in the sacrificial layer is also chosen for its etchability over long distances starting from a given location.

The sacrificial layer may be made from a metal such as tungsten or aluminium, from an organic material such as photosensitive resins or polyimide, from a dielectric material such as silicon oxide ($SiO_2$) or any material with the qualities indicated above.

Figure 4:
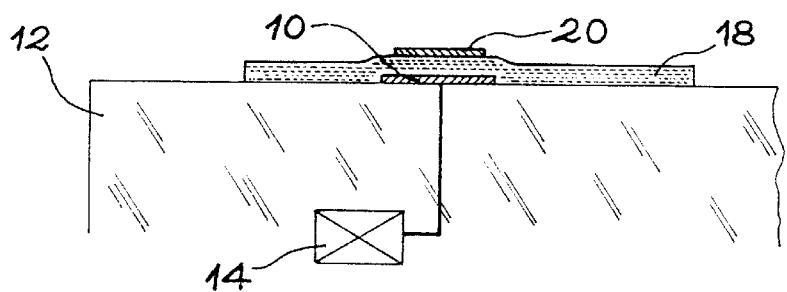

A second layer of conducting material is formed above the layer of sacrificial material and is then formed by etching to form a second electrode. This second electrode is shown in FIG. 4 as reference 20. It is located at least partially above the first electrode 10 and is separated from it by a layer of sacrificial material. The second layer of conducting material is made for example from Ti, TiN or Cr with a thickness of the order of 100 nm to a few $\mu$m. It is made using cathodic spraying, evaporation or electrolysis techniques.

Figure 5:
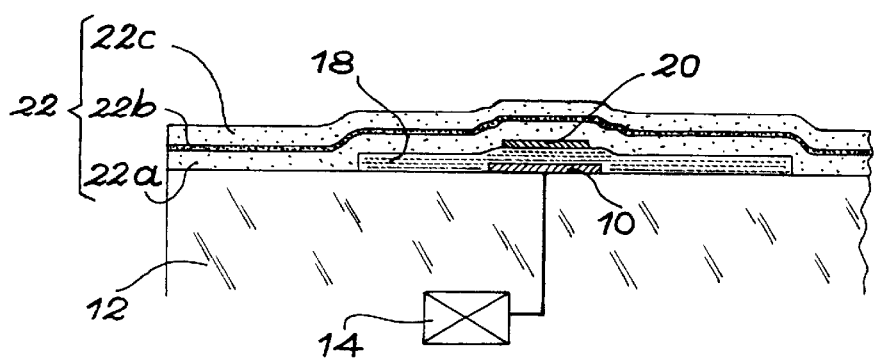

A subsequent step in the process shown in FIG. 5 includes the formation of a first layer 22 called the membrane layer. The membrane layer 22 covers the second electrode 20, the layer of sacrificial material 18 and extends at least partly over the surface of support 12.

The first layer membrane 22 may be a single coat of an electrically insulating material. For example it may be a 0.8 $\mu$m thick $Si_3N_4$ layer deposited using a plasma aided chemical vapor deposition (PECVD) technique. It may also have a flaky structure with three sublayers 22a, 22b and 22c, as shown in FIG. 5. The median sublayer 22b is an etch stop sublayer used during subsequent thinning of the first membrane layer. This thinning is described in the rest of the text.

For example, a membrane layer 22 with a total thickness of 0.76 may comprise a sublayer 22a consisting of 0.3 $\mu$m of $Si_3N_4$, a stop sublayer 22b consisting of 0.06 $\mu$m of $SiO_2$ and a sublayer 22c of 0.4 $\mu$m of $Si_3N_4$. The etch stop sublayer may also be a metallic layer. It is then preferably insulated from the second electrode 20 by a first sublayer 22a made of an electrically insulating material.

Figure 6:
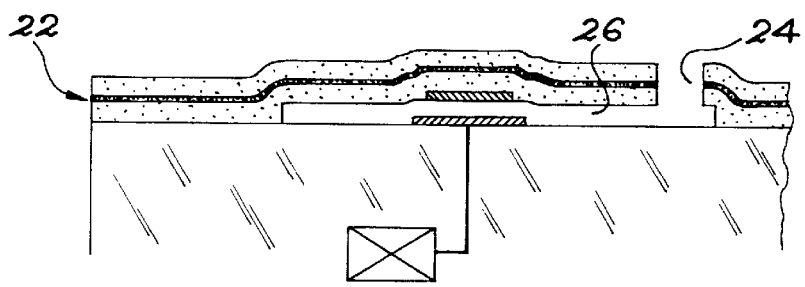

As shown in FIG. 6, an opening 24 forming an etching channel is made in membrane 22 to reach a peripheral region in the layer of sacrificial material. The sacrificial layer is completely eliminated through this opening 24, for example by chemical attack. Elimination of the sacrificial material opens up a chamber 26 in the microsystem that enables deformation of the membrane layer 22. The second electrode 20 remains bonded to the membrane layer 22 which keeps it separate from the first electrode 10.

A second membrane layer 28 is then deposited on the first membrane layer 22 to close the opening 24 and thus close chamber 26.

The second membrane layer is preferably a layer of $SiO_2$, $Si_3N_4$, or metal. For example it may be a 0.8 $\mu$m thick layer of $Si_3N_4$ deposited by a plasma aided chemical vapor deposition (PECVD) technique.

Figure 7:
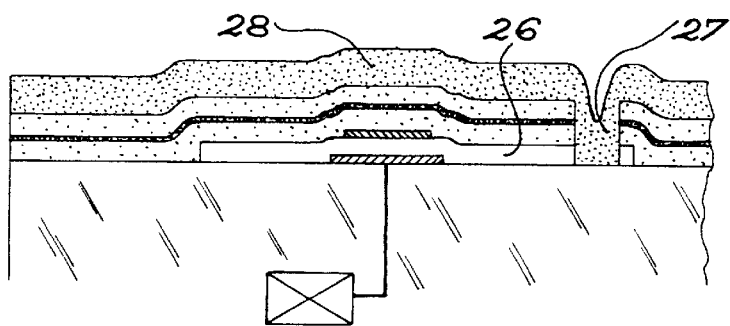

The thickness of the second membrane layer 26 is generally chosen to be sufficient to close opening 24 made in the first membrane layer. Note on FIG. 7 the formation of a plug 27 that may be supported on the surface of support 12. When opening 24 is made in a peripheral region, this type of plug does not compromise the flexibility of the membrane layer (s).

Preferably, the second membrane layer 28 may be formed under a vacuum to obtain a vacuum sealed chamber 26.

Figure 8:
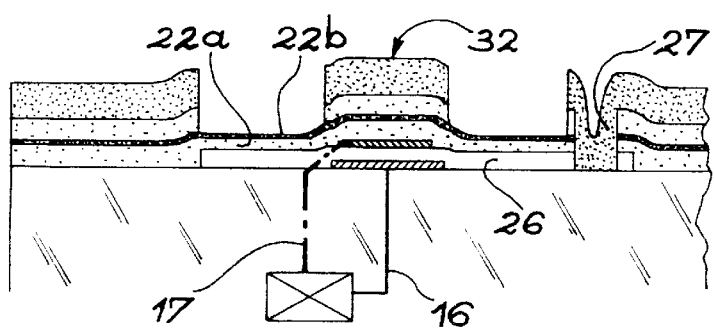

A next step shown in FIG. 8 consists of eliminating the second membrane layer 26 in a region surrounding the second electrode 20 and thinning the first membrane layer in the same region.

For example, thinning may be done by etching, stopping on the stop sublayer 22b described above.

The remaining thickness of the first membrane layer is then of the order of 0.3 to 0.4 $\mu$m. This thickness may be adjusted as a function of the size of chamber 26, the nature of the materials used for the membrane layer and as a function of a sensitivity of the microsystem made.

Adjustment of the thickness affects the flexibility of the membrane. However, the first membrane layer is preferably kept sufficiently thick to prevent collapse into chamber 26, particularly when chamber 26 is kept under a vacuum.

Furthermore, a part 32 of the first membrane layer and possibly of the second membrane layer may be kept above the second electrode 20 to prevent its deformation.

Similarly, part of the second membrane layer is also kept in the region of the opening 24 and the plug 27.

Finally, note that an electrical connection 17 shown very schematically as a chain dotted line in FIG. 8 may also be provided between the second electrode 20 and the electronic circuit 14.

The electronic circuit 14 may for example be equipped with means of measuring an electric capacitance between the first and second electrodes 10, 20. Pressure exerted on the membrane causes its deformation and modifies the distance separating the electrodes, and consequently an electric capacitance measured between these electrodes.

The first and second electrodes may also make up contact terminals when the microsystem is used as a microswitch.

In this case, it is useful if at least one of the first and second electrodes project above their support surface, to make good contact between the first and the second electrodes when the microswitch is activated. The shape of the second electrode depends on the shape of the second conducting layer formed on the layer of sacrificial material and consequently on the shape given to the upper surface of the layer of sacrificial material.

Figure 9:
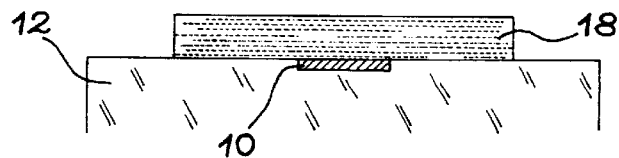
FIGS. 9 and 10 show a sectional view of a step in which a sacrificial material layer is thinned locally.

In the case shown in FIG. 9, a layer of sacrificial material 18 is formed above a first electrode 10, the surface of which is flush with the surface of support 12. Therefore the surface of the sacrificial layer is plane. For better readability, the thickness of the layer of sacrificial material is shown larger in FIGS. 9 to 14.

Figure 10:
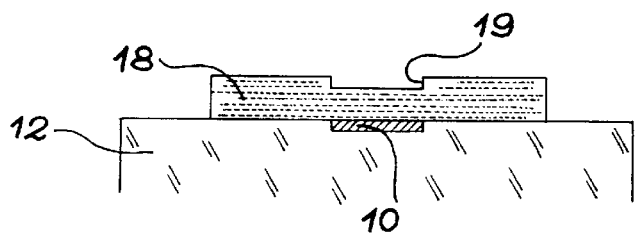

A recess 19 etched in the upper surface of layer 18 of the sacrificial material as shown in FIG. 10, is used to form a second layer of conducting material in a later step that projects towards the first electrode 10.

Figure 11:
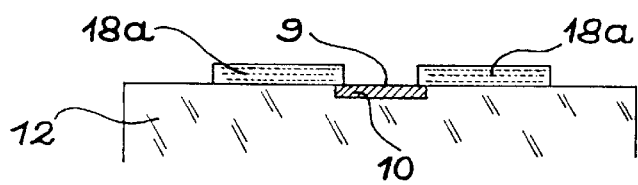
FIGS. 11 and 12 show a sectional view of an alternative of the step for making the layer of sacrificial material.

A second technique is used to make the recess 19. This technique, as shown in FIG. 11, consists of forming firstly a first layer of sacrificial material 18a that surrounds at least part 9 of the first conducting layer 10. The surface of part 9 of the first conducting layer thus forms a pattern recessed from the free surface of the first layer of sacrificial material 18a.

Figure 12:
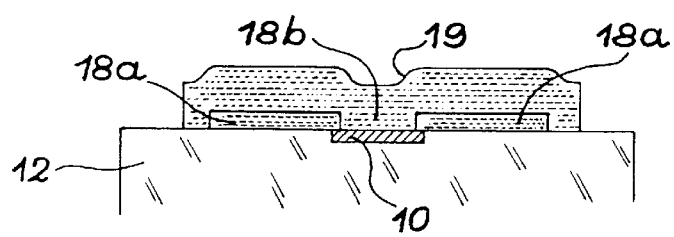

A second layer of sacrificial material 18b is then formed on the first layer of sacrificial material 18a and on part 9 of the conducting layer left uncovered. Thus the pattern with a recess 19 is reproduced on the surface of the second layer of sacrificial material 18b. This recess, visible in FIG. 12, is used in the rest of the process to make a second conducting layer forming a projection.

Figure 13:
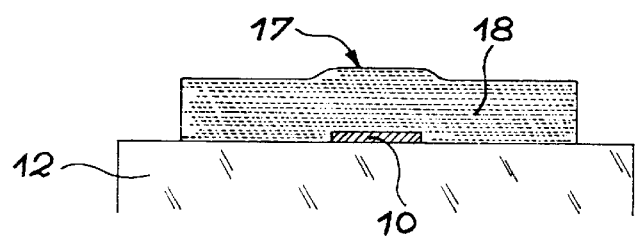
FIGS. 13 and 14 show a sectional view of another alternative of the step for making the layer of sacrificial material.
Figure 14:
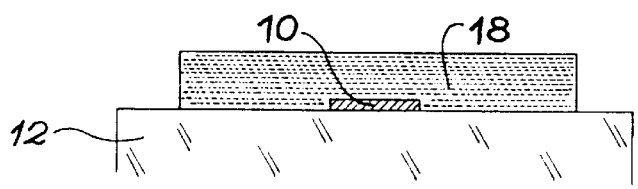

FIGS. 13 and 14 show the formation of the layer of sacrificial material 18 when the first electrode 10 formed on the support 12 projects above this surface. The prominence formed by the conducting layer 10, as shown in FIG. 13 is located on the upper surface of the layer of sacrificial material 18. It is indicated as reference 17. This type of prominence would cause a recessed formation of the second conducting layer in a region located above the first conducting layer 10.

To prevent this phenomenon, it is possible to flatten the upper surface of the sacrificial layer 18 as shown in FIG. 14, before formation of the second conducting layer.

Figure 15:
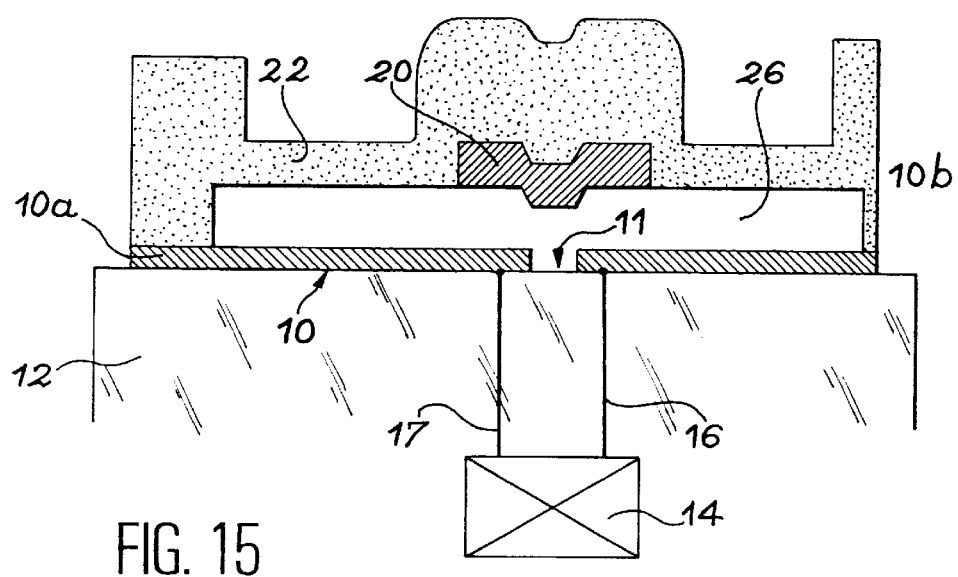
FIG. 15 is a schematic section at a larger scale of a microsystem according to the invention, forming an alternative to that shown in FIG. 8.

FIG. 15 shows an alternative embodiment of a microsystem according to the invention at a larger scale. For simplification reasons, identical references are used to denote parts identical to or similar to parts shown on previous figures. Therefore, the previous description is valid.

The microsystem made on a substrate 12 comprises a first electrode 10 supported by this substrate. The first electrode comprises two parts 10a and 10b separated by a groove 11. Thus parts 10a and 10b that are formed on an insulating substrate 12 are electrically isolated by the substrate and by the groove 11. The groove is located approximately in the middle of a chamber 26 in the microsystem, delimited at the sides and the top by a flexible membrane 22.

A second electrode 20 fixed to the membrane 22 is located approximately above a region of the electrode 10 comprising the groove 11.

Thus, when sufficient pressure is applied to membrane 22, the electrode 20 comes into contact with parts 10a and 10b of the first electrode 10 and electrically connects them together.

The microsystem in FIG. 15 can thus be used as a microswitch, in which the terminals are parts 10a and 10b of the second electrode 10.

The microsystem in FIG. 15 can also be used as a pressure sensor with an On/Off type detection.

Parts 10a and 10b of the first electrode are connected to a circuit 14 integrated in substrate 12 under the microsystem. This circuit and the electrical connections 16, 17 that connect it to part parts 10a and 10b of the first electrode are shown very schematically.

Note also that membrane 22 is thinned locally to make it more flexible.

In FIG. 15, the layer forming the membrane 22 is shown in contact with the first electrode. However, it may also be in direct contact with substrate 12, for example as shown in FIG. 6.

Figure 16:
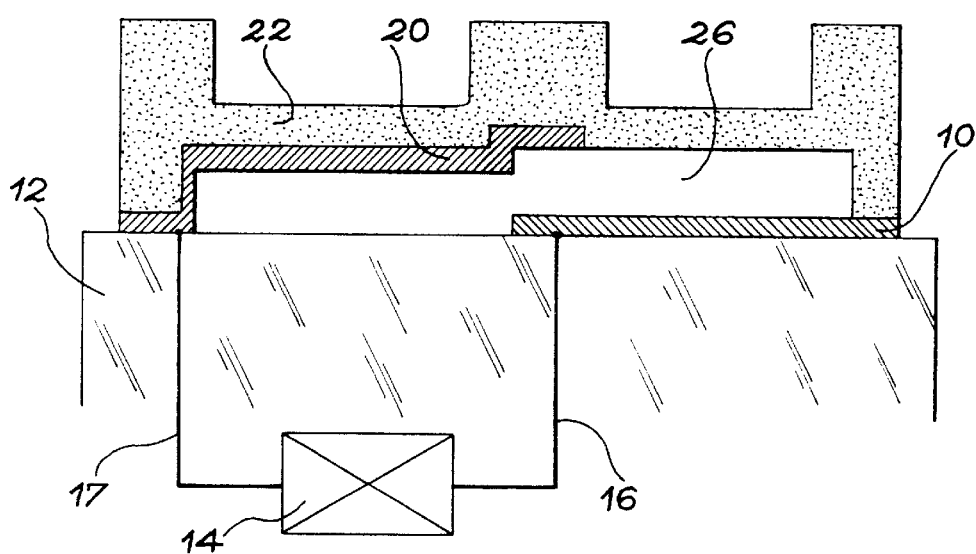
FIG. 16 is a schematic section at a larger scale of a microsystem according to the invention, forming an alternative to that shown in FIG. 15.

FIG. 16 shows another possible embodiment of the microsystem usable particularly as a microswitch.

The first and second electrodes 10, 20 located under the substrate 12 and the membrane 22 respectively, each extends into another region approximately in the middle of chamber 26.

The second electrode 20, initially kept apart from the first electrode 10 by the flexible membrane 22, comes into contact with the first electrode 10 in the overlap area under the effect of sufficient pressure applied to membrane 22.

Thus the first and second electrodes can form the terminals of a switch. The first and second electrodes are electrically connected to an electronic circuit 14 which may for example be located in substrate 12.

In this respect, the second layer of conducting material in which the second electrode is formed preferably extends as far as substrate 12.

REFERENCED DOCUMENTS (1) FR-A-2 700 003
(2) CA-A-2 130 505
(3)
A surface micromachined miniature switch for telecommunication applications with signal frequencies from DC up to 4 GHz from J. Jason and F. Chang, International Conference on Solid State, Sensors and Actuators, Stockholm, Sweden Jun. 25–29, 1995.

What is claimed is:
1. Pressure sensor cell comprising:
   a substrate including at least a first electrode;
   a deformable membrane fixed by a peripheral edge thereof to the substrate and spaced from said substrate to define a closed chamber around at least part of the first electrode;
   a second electrode formed on a wall of the membrane facing the first electrode, the second electrode being kept separate from the first electrode if there is no pressure exerted on the membrane, and an electronic circuit placed in the substrate under the first electrode wherein said deformable member includes a rigid part located above the second electrode.
2. Pressure sensor cell according to claim 1 wherein said electronic circuit is an electronic measurement circuit integrated into the substrate and connected to the first and second electrodes.
3. Pressure sensor cell according to claim 2 in which the integrated circuit (14) is of the CMOS type or the BiCMOS type.
4. Pressure sensor cell according to claim 1, in which the membrane comprises a part above the second electrode (20).

5. Pressure sensor cell according to claim 2 in which the measurement circuit comprises a capacitance meter for measuring a variation in the electrical capacitance between the first and the second electrodes.

6. Pressure sensor cell according to claim 1, in which the first electrode (10) comprises a first and second parts (10*a*, 10*b*) separated by a groove (11) and in which the second electrode (20) is located at least partly above the groove (11) so that it is kept in contact with the first and second parts to connect them electrically when sufficient pressure is applied on the membrane (22).

7. A sensor comprising a number of adjacent pressure sensor cells in which each pressure sensor cell comprises:

a substrate (12) including at least a first electrode (10), a deformable membrane (22) fixed by a peripheral edge thereof to the substrate and spaced from said substrate to define a closed chamber (26) around at least part of the first electrode (10), a second electrode (20) formed on a wall of the membrane (22) facing the first electrode, the second electrode being kept separate from the first electrode if there is no pressure exerted on the membrane and an electronic circuit placed in the substrate under the first electrode.

* * * * *